United States Patent
Barnes

(10) Patent No.: US 8,707,914 B2
(45) Date of Patent: Apr. 29, 2014

(54) ENGINE HAVING INTEGRATED WASTE HEAT RECOVERY

(75) Inventor: David M. Barnes, Columbus, IN (US)

(73) Assignee: Cummins Intellectual Property, Inc., Minneapolis, MN (US)

( * ) Notice: Subject to any disclaimer, the term of this patent is extended or adjusted under 35 U.S.C. 154(b) by 68 days.

(21) Appl. No.: 13/407,647

(22) Filed: Feb. 28, 2012

(65) Prior Publication Data

US 2012/0216763 A1 Aug. 30, 2012

Related U.S. Application Data

(60) Provisional application No. 61/447,428, filed on Feb. 28, 2011.

(51) Int. Cl.
- *F01P 9/02* (2006.01)
- *F01P 3/00* (2006.01)
- *F01K 23/10* (2006.01)
- *F02B 19/00* (2006.01)

(52) U.S. Cl.
USPC .............. 123/41.2; 123/41.21; 123/41.42; 123/252; 60/618

(58) Field of Classification Search
USPC ......... 123/41.2, 41.25, 41.42, 3, 41.44, 82 R, 123/41.29; 60/3, 618
See application file for complete search history.

(56) References Cited

U.S. PATENT DOCUMENTS

| | | | |
|---|---|---|---|
| 3,232,052 A | 2/1966 | Ricard | |
| 3,353,522 A * | 11/1967 | Ley | 123/41.31 |
| 3,789,804 A | 2/1974 | Aguet | |
| 4,009,587 A | 3/1977 | Robinson, Jr. et al. | |
| 4,164,850 A | 8/1979 | Lowi, Jr. | |
| 4,204,401 A | 5/1980 | Earnest | |
| 4,232,522 A | 11/1980 | Steiger | |
| 4,267,692 A | 5/1981 | Earnest | |
| 4,271,664 A | 6/1981 | Earnest | |
| 4,393,656 A * | 7/1983 | Anderson et al. | 60/618 |
| 4,428,190 A | 1/1984 | Bronicki | |
| 4,458,493 A | 7/1984 | Amir et al. | |
| 4,581,897 A | 4/1986 | Sankrithi | |
| 4,630,572 A | 12/1986 | Evans | |

(Continued)

FOREIGN PATENT DOCUMENTS

| EP | 1 273 785 B1 | 5/2007 |
|---|---|---|
| JP | 60-222511 A | 11/1985 |

(Continued)

OTHER PUBLICATIONS

International Search Report and the Written Opinion of the International Searching Authority dated Jun. 6, 2012; International Application No. PCT/US2012/027027.

*Primary Examiner* — Lindsay Low
*Assistant Examiner* — Syed O Hasan
(74) *Attorney, Agent, or Firm* — Foley & Lardner LLP

(57) ABSTRACT

A waste heat recovery system connects a working fluid into passages formed within an internal combustion engine. The fluid passages transport the working fluid to high temperature areas of the engine, raising the temperature of the working fluid near the phase change point or above the phase change point. The heated working fluid drives an energy conversion portion located downstream from the engine. The heat absorbed by the working fluid decreases the load on an engine cooling system as well as driving an energy conversion portion, improving fuel efficiency.

19 Claims, 7 Drawing Sheets

(56) References Cited

U.S. PATENT DOCUMENTS

| | | |
|---|---|---|
| 4,726,324 A * | 2/1988 | Itakura .................. 123/41.1 |
| 4,831,817 A | 5/1989 | Linhardt |
| 4,873,829 A | 10/1989 | Williamson |
| 4,911,110 A | 3/1990 | Isoda et al. |
| 5,121,607 A | 6/1992 | George, Jr. |
| 5,207,188 A | 5/1993 | Hama et al. |
| 5,421,157 A | 6/1995 | Rosenblatt |
| 5,649,513 A | 7/1997 | Kanda |
| 5,685,152 A | 11/1997 | Sterling |
| 5,771,868 A | 6/1998 | Khair |
| 5,806,322 A | 9/1998 | Cakmakci et al. |
| 5,915,472 A | 6/1999 | Takikawa et al. |
| 5,950,425 A | 9/1999 | Takahashi et al. |
| 6,014,856 A | 1/2000 | Bronicki et al. |
| 6,035,643 A | 3/2000 | Rosenblatt |
| 6,055,959 A | 5/2000 | Taue |
| 6,138,649 A | 10/2000 | Khair et al. |
| 6,301,890 B1 | 10/2001 | Zeretzke |
| 6,321,697 B1 | 11/2001 | Matsuda et al. |
| 6,324,849 B1 | 12/2001 | Togawa et al. |
| 6,393,840 B1 | 5/2002 | Hay |
| 6,494,045 B2 | 12/2002 | Rollins, III |
| 6,523,349 B2 | 2/2003 | Viteri |
| 6,571,548 B1 | 6/2003 | Bronicki et al. |
| 6,598,397 B2 | 7/2003 | Hanna et al. |
| 6,606,848 B1 | 8/2003 | Rollins, III |
| 6,637,207 B2 | 10/2003 | Konezciny et al. |
| 6,701,712 B2 | 3/2004 | Bronicki et al. |
| 6,715,296 B2 | 4/2004 | Bakran et al. |
| 6,745,574 B1 | 6/2004 | Dettmer |
| 6,748,934 B2 | 6/2004 | Natkin et al. |
| 6,751,959 B1 | 6/2004 | McClanahan et al. |
| 6,792,756 B2 | 9/2004 | Bakran et al. |
| 6,810,668 B2 | 11/2004 | Nagatani et al. |
| 6,817,185 B2 | 11/2004 | Coney et al. |
| 6,848,259 B2 | 2/2005 | Kelller-Sornig et al. |
| 6,877,323 B2 | 4/2005 | Dewis |
| 6,880,344 B2 | 4/2005 | Radcliff et al. |
| 6,910,333 B2 | 6/2005 | Minemi et al. |
| 6,964,168 B1 | 11/2005 | Pierson et al. |
| 6,977,983 B2 | 12/2005 | Correia et al. |
| 6,986,251 B2 | 1/2006 | Radcliff et al. |
| 7,007,487 B2 | 3/2006 | Belokon et al. |
| 7,028,463 B2 | 4/2006 | Hammond et al. |
| 7,044,210 B2 | 5/2006 | Usui |
| 7,069,884 B2 | 7/2006 | Baba et al. |
| 7,117,827 B1 | 10/2006 | Hinderks |
| 7,121,906 B2 | 10/2006 | Sundel |
| 7,131,259 B2 | 11/2006 | Rollins, III |
| 7,131,290 B2 | 11/2006 | Taniguchi et al. |
| 7,159,400 B2 | 1/2007 | Tsutsui et al. |
| 7,174,716 B2 | 2/2007 | Brasz et al. |
| 7,174,732 B2 | 2/2007 | Taniguchi et al. |
| 7,191,740 B2 | 3/2007 | Baba et al. |
| 7,200,996 B2 | 4/2007 | Cogswell et al. |
| 7,225,621 B2 | 6/2007 | Zimron et al. |
| 7,281,530 B2 | 10/2007 | Usui |
| 7,325,401 B1 | 2/2008 | Kesseli et al. |
| 7,340,897 B2 | 3/2008 | Zimron et al. |
| 7,454,911 B2 | 11/2008 | Tafas |
| 7,469,540 B1 | 12/2008 | Knapton et al. |
| 7,578,139 B2 | 8/2009 | Nishikawa et al. |
| 7,665,304 B2 | 2/2010 | Sundel |
| 7,721,552 B2 | 5/2010 | Hansson et al. |
| 7,797,940 B2 | 9/2010 | Kaplan |
| 7,823,381 B2 | 11/2010 | Misselhorn |
| 7,833,433 B2 | 11/2010 | Singh et al. |
| 7,866,157 B2 | 1/2011 | Ernst et al. |
| 7,942,001 B2 | 5/2011 | Radcliff et al. |
| 7,958,873 B2 | 6/2011 | Ernst et al. |
| 2002/0099476 A1 | 7/2002 | Hamrin et al. |
| 2003/0033812 A1 | 2/2003 | Gerdes et al. |
| 2003/0213245 A1 | 11/2003 | Yates et al. |
| 2003/0213246 A1 | 11/2003 | Coll et al. |
| 2003/0213248 A1 | 11/2003 | Osborne et al. |
| 2005/0262842 A1 | 12/2005 | Claassen et al. |
| 2008/0289313 A1 | 11/2008 | Batscha et al. |
| 2009/0031724 A1 | 2/2009 | Ruiz |
| 2009/0090109 A1 | 4/2009 | Mills et al. |
| 2009/0121495 A1 | 5/2009 | Mills |
| 2009/0133646 A1 | 5/2009 | Wankhede et al. |
| 2009/0151356 A1 | 6/2009 | Ast et al. |
| 2009/0179429 A1 | 7/2009 | Ellis et al. |
| 2009/0211253 A1 | 8/2009 | Radcliff et al. |
| 2009/0241543 A1 | 10/2009 | Ernst |
| 2009/0320477 A1 | 12/2009 | Juchymenko |
| 2009/0322089 A1 | 12/2009 | Mills et al. |
| 2010/0018207 A1 | 1/2010 | Juchymenko |
| 2010/0071368 A1 | 3/2010 | Kaplan et al. |
| 2010/0083919 A1 | 4/2010 | Bucknell |
| 2010/0139626 A1 | 6/2010 | Raab et al. |
| 2010/0180584 A1 | 7/2010 | Berger et al. |
| 2010/0192569 A1 | 8/2010 | Ambros et al. |
| 2010/0229525 A1 | 9/2010 | Mackay et al. |
| 2010/0257858 A1 | 10/2010 | Yaguchi et al. |
| 2010/0263380 A1 | 10/2010 | Biederman et al. |
| 2010/0282221 A1 | 11/2010 | Le Lievre |
| 2010/0288571 A1 | 11/2010 | Dewis et al. |
| 2010/0300100 A1 * | 12/2010 | Harmon et al. .................. 60/645 |
| 2011/0005477 A1 | 1/2011 | Terashima et al. |
| 2011/0006523 A1 | 1/2011 | Samuel |
| 2011/0094485 A1 | 4/2011 | Vuk et al. |
| 2011/0209473 A1 | 9/2011 | Fritz et al. |
| 2012/0023946 A1 | 2/2012 | Ernst et al. |

FOREIGN PATENT DOCUMENTS

| | | |
|---|---|---|
| JP | 8-68318 A | 3/1996 |
| JP | 9-32653 A | 2/1997 |
| JP | 10-238418 A | 9/1998 |
| JP | 11-166453 A | 6/1999 |
| JP | 2005-36787 A | 2/2005 |
| JP | 2005-42618 A | 2/2005 |
| JP | 2005-201067 A | 7/2005 |
| JP | 2005-329843 A | 12/2005 |
| JP | 2008-240613 A | 10/2008 |
| JP | 2009-167995 A | 7/2009 |
| JP | 2009-191647 A | 8/2009 |
| JP | 2010-77964 A | 4/2010 |
| WO | 2009/098471 A2 | 8/2009 |

* cited by examiner

ENGINE HAVING INTEGRATED WASTE HEAT RECOVERY

CROSS-REFERENCE TO RELATED APPLICATIONS

This application claims the benefit of priority to U.S. Provisional Patent Application No. 61/447,428, filed on Feb. 28, 2011, which is hereby incorporated by reference in its entirety.

TECHNICAL FIELD

This disclosure relates to a waste heat recovery (WHR) system with fluid passages integrated into an internal combustion engine.

BACKGROUND

Recovering waste heat is one way to meet legislated and competitive fuel efficiency requirements for internal combustion engines. A WHR system to recover heat energy generated by an internal combustion engine that would otherwise be lost through cooling and heat rejection is one way to improve engine efficiency. To recover waste heat economically, relatively high temperature sources are the most desirable, such as exhaust gas recirculation (EGR) coolers, pre-charge air coolers (pre-CAC), and exhaust system heat exchangers. Each of these high temperature sources relate to heat in a gas stream, such as exhaust gas and compressed intake gas. In contrast, heat transferred to a coolant system has been of insufficient quality to recover economically. If some of the heat typically rejected to a coolant system could be recovered, then engine efficiency could be improved by using previously unrecoverable heat energy and by reducing the load on an engine cooling system, which then allows for reduced parasitic load from one or more cooling system pumps.

SUMMARY

This disclosure provides an internal combustion engine comprising an engine body, a cylinder head and a waste heat recovery system. The engine includes a plurality of cylinders. The cylinder head is attached to the engine body along an interface and includes a plurality of coolant passages formed therein. The waste heat recovery system includes a waste heat recovery circuit that includes a plurality of passages formed within at least one of the cylinder head and the engine body. At least one of the plurality of passages is positioned axially between at least one coolant passage and the interface. A pump is positioned along the waste heat recovery circuit upstream from the plurality of passages. An energy conversion portion is positioned along the waste heat recovery circuit downstream from the plurality of passages. The pump is operable to transport a working fluid through the waste heat recovery circuit.

Advantages and features of the embodiments of this disclosure will become more apparent from the following detailed description of exemplary embodiments when viewed in conjunction with the accompanying drawings.

DETAILED DESCRIPTION

Figure 1:
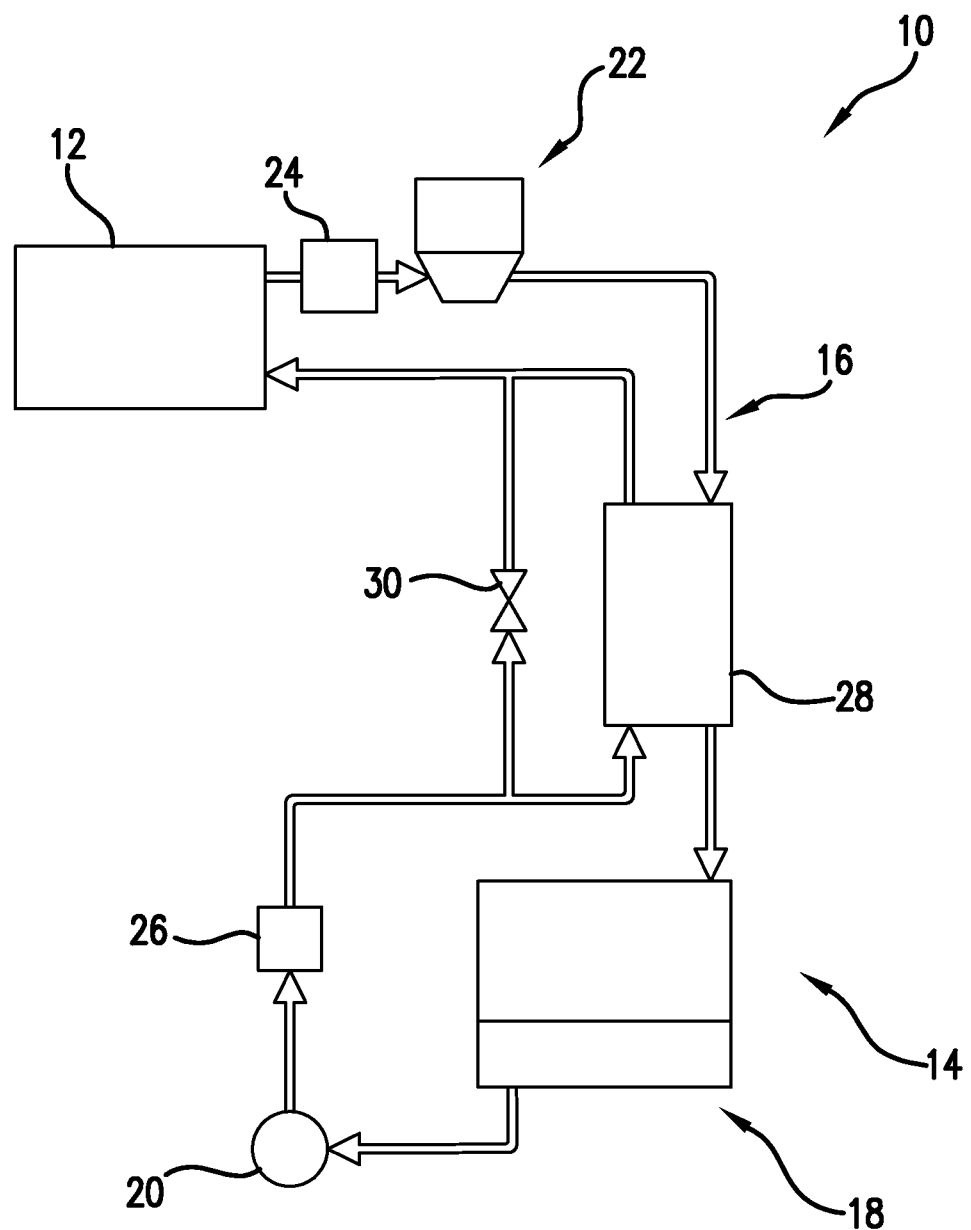
FIG. 1 is a schematic of an internal combustion engine incorporating an exemplary embodiment of a WHR system of the present disclosure.
Figure 2:
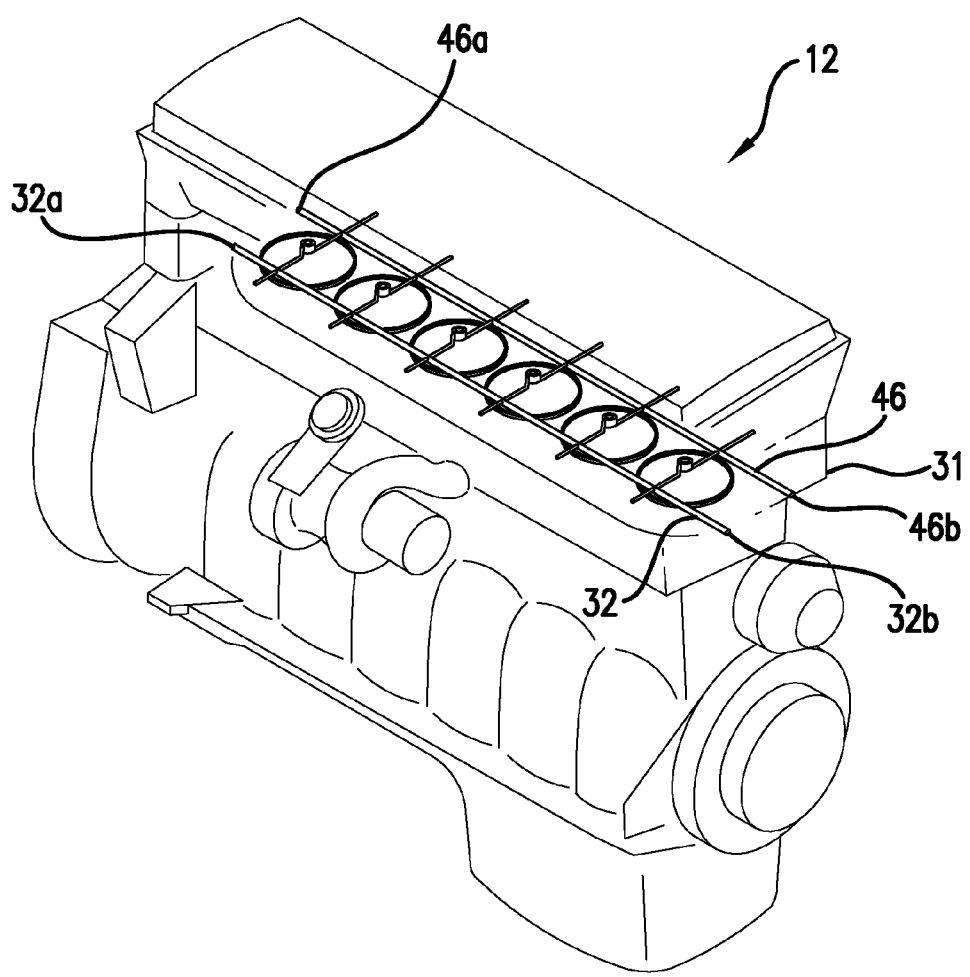
FIG. 2 is a perspective view of an engine body of FIG. 1 overlaid with fluid passages that are part of the WHR system.
Figure 3:
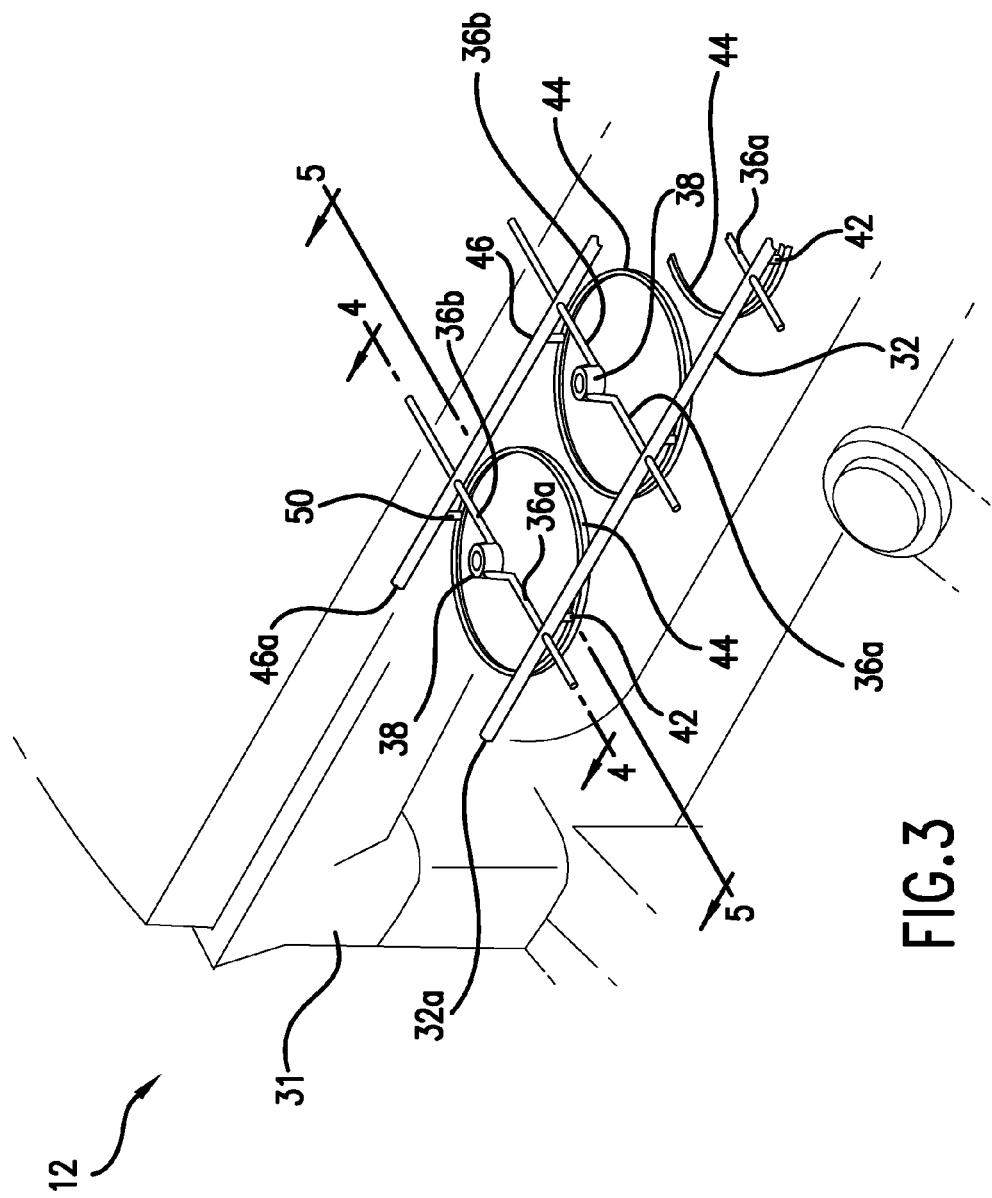
FIG. 3 is a view of a portion of the engine body of FIG. 2.
Figure 4:
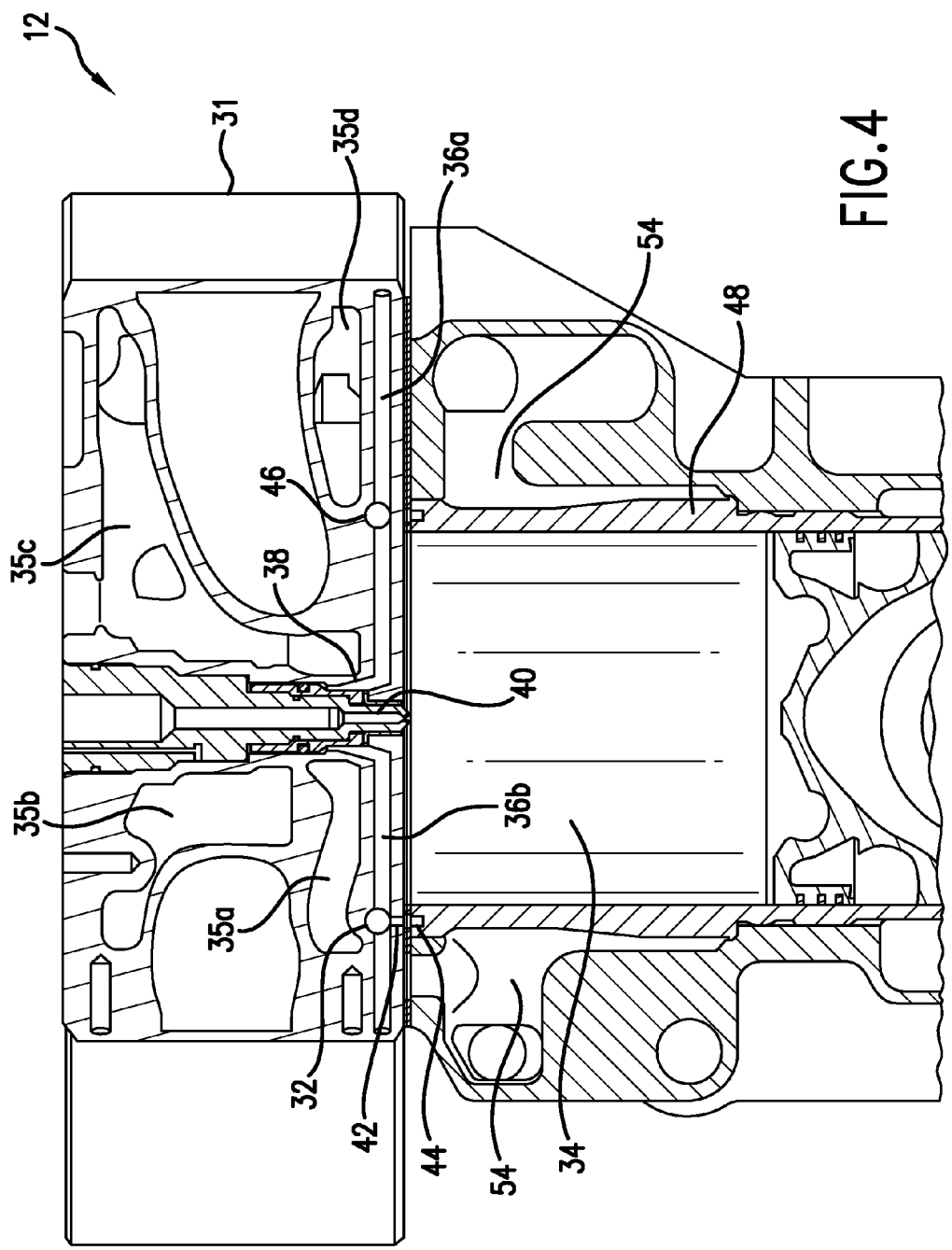
FIG. 4 is a sectional view of a portion of the engine body of FIG. 3 along the lines 4-4.
Figure 5:
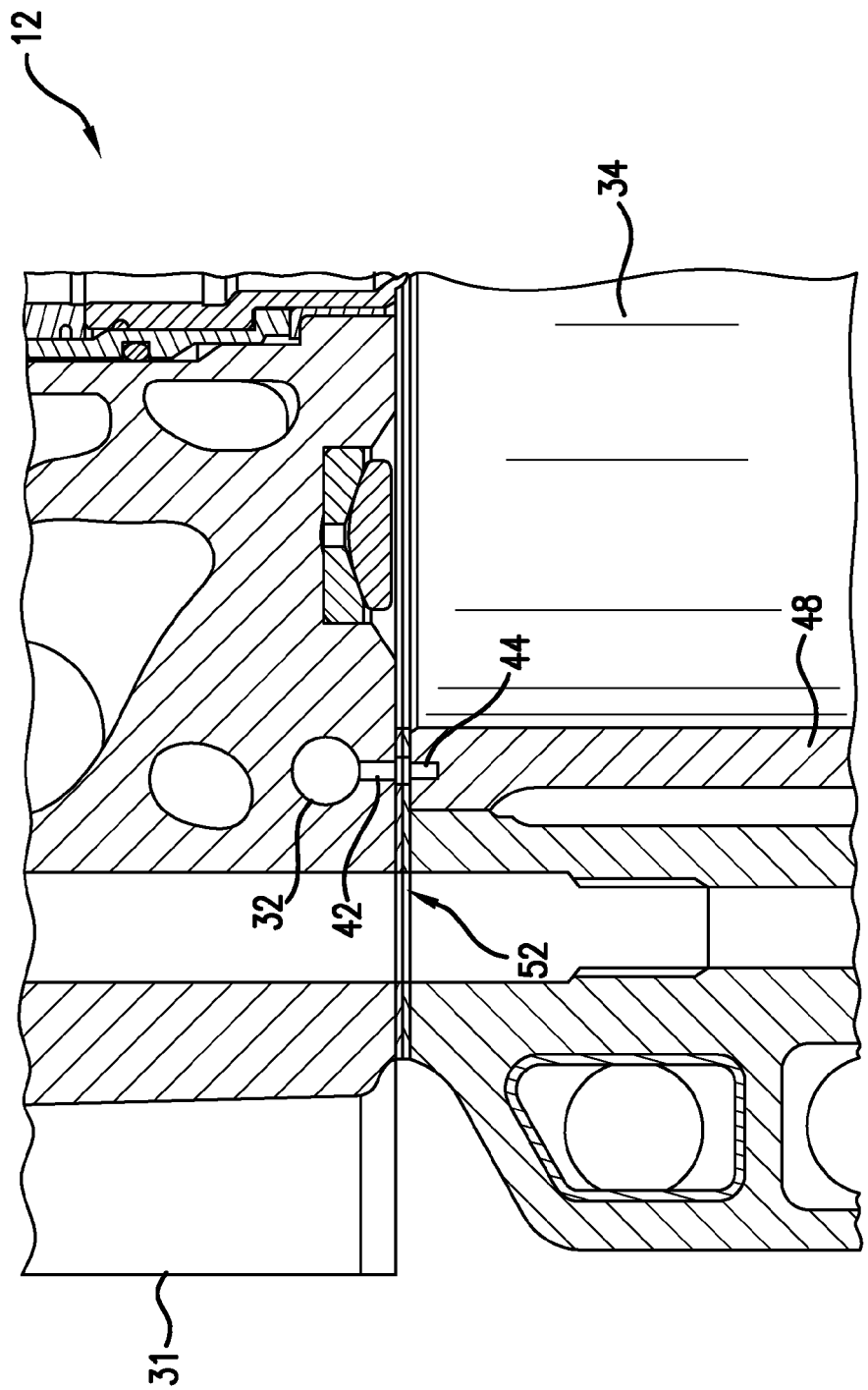
FIG. 5 is a sectional view of a portion of the engine body of FIG. 3 along the lines 5-5.

Referring to FIG. 1, an internal combustion engine 10 incorporates an exemplary embodiment of the present disclosure. Engine 10 includes an engine body 12, and a WHR system 14.

WHR system 14 includes a WHR circuit 16, including a working fluid cooling and containment system (FCCS) 18, a working fluid pump 20, an energy conversion portion 22, and a plurality of passages formed in cylinder head 31 and that may be formed in engine body 12, described hereinbelow. WHR circuit 16 connects FCCS 18 to engine body 12. Pump 20 is positioned along WHR circuit 16 between FCCS 18 and engine body 12, downstream from FCCS 18. Energy conversion portion 22 is positioned along WHR circuit 16 between engine body 12 and FCCS 18, downstream from engine body 12.

Pump 20 moves a working fluid from FCCS 18 through WHR circuit 16. Working fluids may be organic and inorganic, and include Genetron® R-245fa from Honeywell, Therminol®, Dowtherm J™ from Dow Chemical Co., Fluorinol® from American Nickeloid, toluene, dodecane, isododecane, methylundecane, neopentane, neopentane, octane, water/methanol mixtures, steam, and other fluids suitable for the anticipated temperature ranges and for the materials used in the various described devices and systems. The working fluid flows into engine body 12 where heat is transferred from engine body 12, as will be described in more detail hereinbelow, to the working fluid. The heat transfer from engine body 12 may vaporize the working fluid in engine body 12 or the working fluid may be heated to a relatively high level in engine body 12 and then flow through a downstream heat exchanger 24 where the working fluid is vaporized.

The vaporized working fluid then flows into energy conversion portion 22. Energy conversion portion 22 is capable of producing additional work or transferring energy to another device or system. For example, energy conversion portion 22 may be a turbine, piston, scroll, screw, or other type of expander device that moves, e.g., rotates, as a result of expanding working fluid vapor to provide additional work. The additional work can be fed into the engine's driveline to supplement the engine's power either mechanically or electrically (e.g., by turning a generator), or it can be used to drive a generator and power electrical devices, parasitics or a storage battery (not shown). Alternatively, energy conversion portion 22 can be used to transfer energy from one system to another system (e.g., to transfer heat energy from WHR system 14 to a fluid for a heating system). One type of energy conversion portion 22 is described in more detail in U.S.

patent application Ser. No. 13/347,322, filed Jan. 10, 2012, the entire content of which is hereby incorporated by reference.

The working fluid loses pressure and heat as it flows through energy conversion portion 22. Downstream from energy conversion portion 22, the working fluid flows into FCCS 18, where the working fluid condenses into a liquid. The working fluid, now a liquid, may be sub-cooled and stored in FCCS 18, which may include a unitary condenser and sub-cooler, a separate condenser and a sub-cooler, a receiver, and other elements.

WHR system 14 may include other devices. A filter drier 26 may be positioned downstream from working fluid pump 20. The function of filter drier 26 is to trap moisture, particulates and other contaminants that might interfere with or cause damage to the operation of WHR circuit 16. A recuperator 28 may be positioned along WHR circuit 16 between pump 20 and engine body 12 as well as between energy conversion portion 22 and FCCS 18. Recuperator 28 may provide warming to the working fluid prior to entry into engine body 12. Such warming may be beneficial during cold start and during other engine operations. Recuperator 28 achieves such warming by receiving vaporized working fluid from energy conversion portion 22 and transferring a portion of the heat from the vaporized working fluid to the liquid working fluid flowing from pump 20 toward engine body 12. A recuperator bypass valve 30 may provide a path around recuperator 28 when heating the liquid working fluid is undesirable. WHR system 14 may also include heat exchanger 24, as previously described, which may be desirable if the heat transferred from engine body 12 to the working fluid provides insufficient conversion to a vapor phase or if the superheat temperature of the vaporized working fluid is less than optimal for operation of energy conversion portion 22.

Referring to FIGS. 2-5, working fluid from WHR circuit 16 flows into cylinder head 31, attached to engine body 12, along a first manifold 32. First manifold 32 is positioned longitudinally along one side of cylinders 34 in engine body 12. A passage 36a extending transversely to engine body 12 and generally perpendicular to first manifold 32 connects first manifold 32 to an annular portion 38 located adjacent or proximate to a fuel injector bore 40. A passage 36b connects annular portion 38 to a second manifold 46, which may be parallel to first manifold 32. During combustion, annular portion 38 receives significant heat transfer from a fuel injector located in fuel injector bore 40. A first passage 42 may extend axially from first manifold 32 to an annular groove 44 formed in the top of a cylinder liner 48. Groove 44 may connect to second manifold 46 by a second passage 50 that extends axially into cylinder head 31 to intersect second manifold 46. A dual cylinder head gasket 52 or other sealing device seals first passage 42, annular groove 44, and second passage 50 along an interface between cylinder head 31 and engine body 12 from the combustion that occurs within cylinder 34 and from coolant flowing through various cooling passages 54 formed in engine body 12. Alternatively, an o-ring could be used with a single seal head gasket (not shown) to maintain sealing of the aforementioned passages. First manifold passage 32 and second manifold passage 46 may be in a first plane that is parallel to a second plane that includes annular groove 44.

One or more passages in cylinder head 31, which may include first longitudinal manifold passage 32, second longitudinal manifold passage 46, transverse passage 36a and transverse passage 36b, are located between one or more coolant passages or chambers 35a, 35b, 35c, and 35d formed in cylinder head 31 and the bottom or interface portion of cylinder head 31. By transferring heat from the combustion process that occurs within engine 10, more specifically along the interface between cylinder head 31 and engine body 12, into the passages of waste heat recovery circuit 16, less heat is transferred to the coolant flowing in coolant passages or chambers 35a, 35b, 35c and 35d. Thus, the heat load on the coolant system of engine 10 from the combustion process is reduced, improving the parasitic load from the coolant system on engine 10 and increasing the efficiency of engine 10. As can be seen from FIG. 4, first manifold passage 32, second manifold passage 46, transverse passage 36a and transverse passage 36b, in addition to being between the interface or bottom portion of cylinder head 31, may also be located in the bottom portion of cylinder head 31 and may lie within a plane.

During combustion in engine cylinders 34, significant heat is generated near the end of engine cylinders 34 adjacent to cylinder head 31 and in the portion of cylinder head 31 about the fuel injector bore. Pump 20 of WHR system 14 moves working fluid through WHR circuit 16. The working fluid enters cylinder head 31 via first manifold 32 formed in cylinder head 31. The working fluid may flow through a plurality of passages formed in various portions of cylinder head 31 and engine body 12 that are located adjacent or proximate to high temperature areas of cylinder head 31 and engine body 12. These passages include one or more passages 36a and 36b that provide working fluid to annular area or portion 38 located adjacent to fuel injector bore 40 and may include first passage 42 that connects to annular groove 44 formed in cylinder liner 48 that connects to second passage 50. Annular groove 44 is in a portion of cylinder liner 48 subjected to significant heat from the combustion process. The temperature of each of these portions may vaporize the working fluid or may raise the temperature of the liquid working fluid close to a phase change point, depending on the fluid chosen and the amount of heat generated in the aforementioned areas. Passage 36a, passage 36b, second passage 50, as well as any other passage formed within engine body 12 or cylinder head 31 that originates with first manifold 32 eventually connects to second manifold 46. Second manifold 46 then carries heated working fluid to WHR circuit 16.

Working fluid may enter and exit the plurality of passages formed in cylinder head 31 through a variety of locations, for example at portion 32a and 32b of first manifold 32 and portion 46a and 46b of second manifold 46. Working fluid may enter first manifold 32 at portion 32a and exit second manifold 46 at location 46b. Working fluid may also enter first manifold 32 at location 32b and exit second manifold 46 at location 46b. Thus, entry and exit into first manifold 32 and second manifold 46 is flexible.

If the working fluid is incompletely vaporized, downstream heat exchanger 24, which may be a single heat exchanger or a plurality of heat exchangers, provides sufficient heat transfer to the working fluid to finish the phase change from a liquid to a gas to provide sufficient energy for energy conversion device 20 to operate efficiently. Such heat exchangers may be for exhaust gas recirculation (EGR) cooling, exhaust gas cooling, and cooling of other temperature sources with sufficient heat capacity to raise the temperature of the liquid working fluid to a vapor or to superheat vaporized working fluid.

Figure 6:
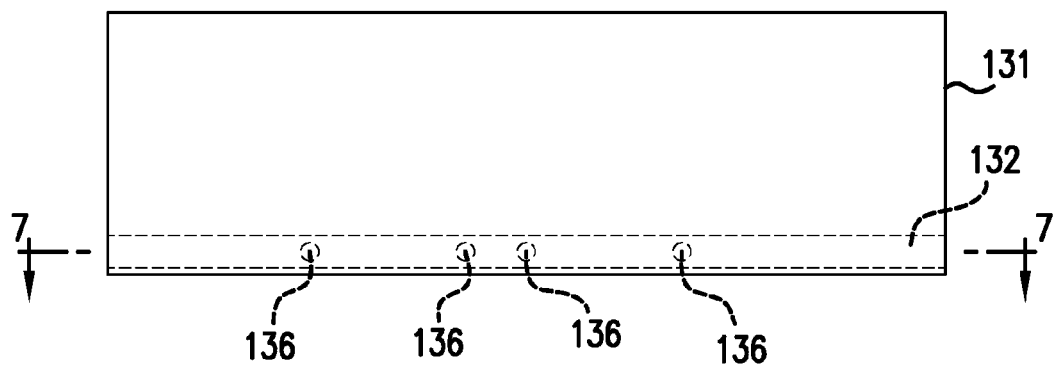
FIG. 6 is a view of a portion of an alternative embodiment cylinder head of the engine body of FIG. 2.
Figure 7:
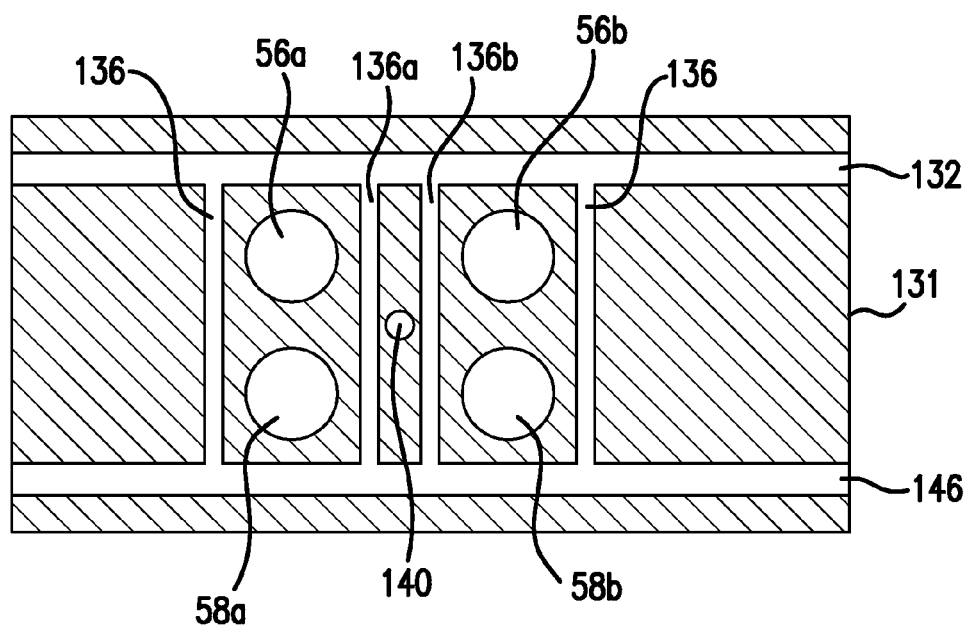
FIG. 7 is sectional view of the cylinder head of FIG. 6 along the lines 7-7.

An alternative embodiment cylinder head 131 that is compatible with engine 10 is shown in FIGS. 6 and 7. Similar to the previous embodiment, first longitudinal manifold 132 receives working fluid from pump 20. First manifold 132 then guides working fluid into a plurality of passages 136. Passages 136 extend past and proximate to at least one intake valve 56 and at least one exhaust valve 58 to connect with a second longitudinal manifold 146 on an opposite side of cylinder head 131 from first manifold 132. Passages 136 preferably extend past exhaust valve 58 in a portion of cylinder head 131 that is as close to the combustion chamber formed in cylinder 34 as possible to take advantage of the heat generated by the combustion process and to reduce the heat load on an associated cooling system for an associated engine, such as engine 10. Thus, passages 136 should be as close as possible to the portion of cylinder head 131 that is adjacent to engine body 12 where the cylinders 34 are located, which may be said to be the bottom portion of cylinder head 131. One passage 136*a* may be located longitudinally between an intake valve 56*a* and a fuel injector bore 140. Cross passage 136*a* may also be located longitudinally between an adjacent exhaust valve 58*a* and fuel injector bore 140, as best seen in FIG. 7. Another passage 136*b* may be located on an opposite side of fuel injector bore 140 from passage 136*a*, but also longitudinally between fuel injector bore 140 and another intake valve 56*b* and another exhaust valve 58*b*.

Because significant heat is generated during the combustion process, and because exhaust gases flow through exhaust valves 58, significant heat transfers to the working fluid flowing through passages 136, which may cause complete vaporization of the working fluid as it flows toward second manifold 146. Though not shown in this figure, the inventors anticipate that passages 136 may be configured to make multiple passes in the area proximate exhaust valves 58 prior to entering second manifold 146, further increasing the temperature of the working fluid as it flows through passages 136.

There are several options to produce passages 36*a*, 36*b* and 136. Passages 36*a* may be drilled from a first side of cylinder head 31 to intersect first manifold 32 and passage 36*b* may be drilled from a second side of cylinder head 31 to intersect section manifold 46. The external openings on cylinder head 31 may then be plugged to seal the internal passages. Passages 136 may be drilled from one side of cylinder head 131 to intersect first manifold 132 and second manifold 146 and then plugged at the exterior of cylinder head 131. Passages 36*a* and 36*b* as well as manifolds 32 and 46 may be cast into cylinder head 31 via one of several casting methods, for example lost wax and sand casting. Similarly, passages 132 and manifolds 146 may be cast into cylinder head 131.

Figure 8:
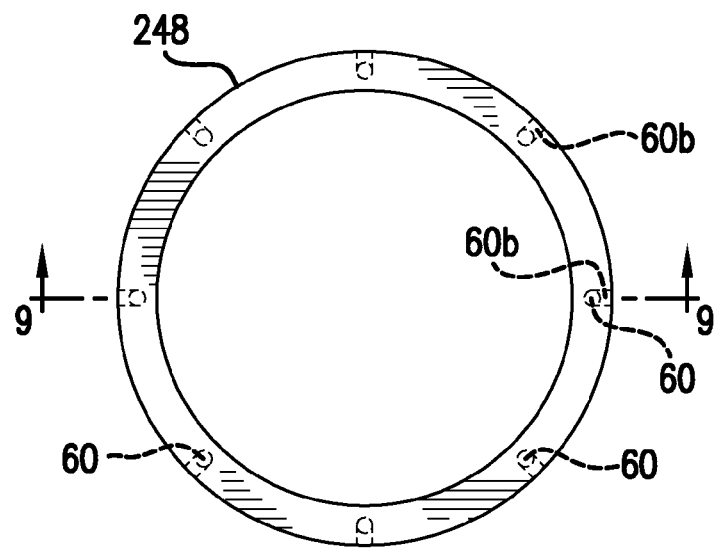
FIG. 8 is a top view of an alternative embodiment cylinder liner of the engine body of FIG. 2.
Figure 9:
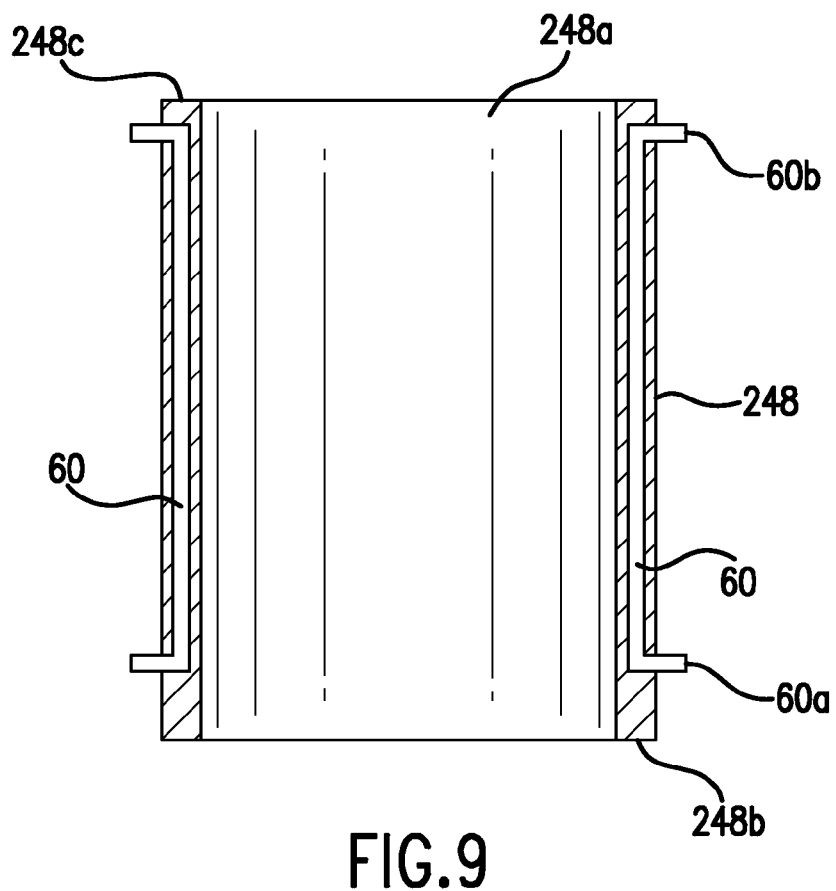
FIG. 9 is a sectional view of the cylinder liner of FIG. 8 along the lines 9-9.

An alternative embodiment cylinder liner 248 compatible with above-described WHR system 14 is shown in FIGS. 8 and 9. Cylinder liner 248 may have a plurality of longitudinal passages 60 formed therein to guide the working fluid along cylinder liner 248. Fluid passages formed in engine body 12 (not shown) that would be similar to the fluid passages formed in cylinder heads 31 and 131 above would transport working fluid to inlets 60*a* of passages 60 and then connect outlets 60*b* of passages 60 with WHR circuit 16. Such connection may be through second manifold 46 or 146 or through another connection to the exterior of engine body 12. Longitudinal passages 60 may be drilled and plugged or may be cast into cylinder liner 248. The working fluid enters at inlet 60*a* and exits at outlet 60*b* to gain the maximum heat transference from the interior of cylinder liner 248 during the combustion process. The combustion process typically occurs near portion 248*a* of cylinder liner 248, so the working fluid will be subjected to increasing temperature as it travels from the region of cylinder liner adjacent to inlet 60*a* to the region of the cylinder liner adjacent to outlet 60*b*. While inlet 60*a* and outlet 60*b* are shown extending perpendicular to longitudinal passage 60, inlet 60*a* may be on first face 248*b* of cylinder liner 248 and outlet 60*b* may be on second face 248*c* of cylinder liner 248, if the configuration of engine body 12 permits such connection locations.

While various embodiments of the disclosure have been shown and described, it is understood that these embodiments are not limited thereto. The embodiments may be changed, modified and further applied by those skilled in the art. Therefore, these embodiments are not limited to the detail shown and described previously, but also include all such changes and modifications.

I claim:

1. An internal combustion engine, comprising:
an engine body including a plurality of cylinders;
a cylinder head attached to the engine body along an interface and including a plurality of coolant passages formed therein;
a waste heat recovery system including a waste heat recovery circuit, which includes a plurality of waste heat recovery passages formed within at least one of the cylinder head and the engine body and sealed from the plurality of coolant passages, the plurality of waste heat recovery passages including a first manifold passage extending longitudinally along a first side of the engine along a first side of the plurality of cylinders, a second manifold passage extending longitudinally along a second side of the engine along a second side of the plurality of cylinders, and at least one transverse passage extending from the first manifold passage to the second manifold passage and fluidly connected to the first manifold passage and the second manifold passage, at least one of the plurality of waste heat recovery passages is positioned axially between at least one coolant passage and the interface; and
a pump positioned along the waste heat recovery circuit upstream from the plurality of waste heat recovery passages, and an energy conversion portion positioned along the waste heat recovery circuit downstream from the plurality of waste heat recovery passages, the pump operable to transport a working fluid through the waste heat recovery circuit.

2. The internal combustion engine of claim 1, further including a fuel injector bore formed in the cylinder head and an annular portion formed about the fuel injector bore, the annular portion connected to the at least one transverse passage.

3. The internal combustion engine of claim 1, wherein the first manifold passage is positioned along a first side of the plurality of cylinders and the second manifold passage is positioned along a second side of the plurality of cylinders.

4. The internal combustion engine of claim 1, the plurality of waste heat recovery passages including an annular groove formed in the end of a cylinder liner positioned within at least one of the plurality of cylinders.

5. The internal combustion engine of claim 4, the plurality of waste heat recovery passages including a first passage extending axially from the first manifold passage to the annular groove and a second passage extending axially from the annular groove to the second manifold passage.

6. The internal combustion engine of claim 4, wherein the first manifold passage and the second manifold passage are in a first plane and the annular groove is in a second plane.

7. The internal engine of claim 6, wherein the first plane and the second plane are parallel.

8. The internal combustion engine of claim 1, including two intake valves and two exhaust valves associated with each cylinder of the plurality of cylinders and the at least one transverse passage is four transverse passages forming two pairs of transverse passages extending from the first manifold passage to the second manifold passage, wherein an intake valve and an exhaust valve are located between each pair of transverse passages.

9. The internal combustion engine of claim 8, further including a fuel injector bore positioned between the two center transverse passages.

10. The internal combustion engine of claim 1, wherein the first manifold passage, the second manifold passage, and the at least one transverse passage are positioned along a portion of the cylinder head 31 that is alongside the interface.

11. The internal combustion engine of claim 1, where the first manifold passage extends along one side of the plurality of cylinders and the second manifold passage extends along a second, opposite side of the plurality of cylinders.

12. The internal combustion engine of claim 1, wherein the first manifold passage is adapted to receive the liquid working fluid from the pump and the second manifold passage is adapted to transfer vaporized working fluid to a downstream portion of the waste heat recovery circuit.

13. The internal combustion engine of claim 12, further including a heat exchanger positioned along the waste heat recovery circuit between the second manifold passage and the energy conversion portion, the heat exchanger operable to increase the temperature of the working fluid beyond the phase change point.

14. The internal combustion engine of claim 1, the at least one transverse passage including a pair of transverse passages extending from the first manifold passage to the second manifold passage, and a fuel injector bore formed in the cylinder head, the pair of transverse passages located alongside the fuel injector bore as the pair of transverse passages extends from the first manifold passage to the second manifold passage.

15. The internal combustion engine of claim 1, further including a recuperator located along the waste heat recovery circuit downstream from the energy conversion portion.

16. The internal combustion engine of claim 15, further including a recuperator bypass valve located along the waste heat recovery circuit in parallel with the recuperator.

17. The internal combustion engine of claim 1, further including a fluid cooling and containment system located between the energy conversion portion and the pump.

18. The internal combustion engine of claim 1, the plurality of waste heat recovery passages including at least one axially extending passage formed in a cylinder liner positioned within at least one of the plurality of cylinders.

19. An internal combustion engine, comprising:
an engine body including a plurality of cylinders;
a cylinder liner positioned in each of the plurality of cylinders;
a cylinder head attached to the engine body along an interface and including a plurality of coolant passages formed therein;
a waste heat recovery system including a waste heat recovery circuit, and a plurality of passages formed in at least one of the cylinder head and the engine body, at least one of the plurality of passages being positioned axially between at least one coolant passage and the interface, and the plurality of passages including an annular groove formed in the cylinder liner, the waste heat recovery system further including a pump positioned along the waste heat recovery circuit upstream from the plurality of passages, and an energy conversion portion positioned along the waste heat recovery circuit downstream from the plurality of passages, the pump operable to transport a working fluid through the waste heat recovery circuit.

* * * * *